(No Model.)
J. T. PAGET.
KITCHEN CABINET.
No. 355,553. Patented Jan. 4, 1887.
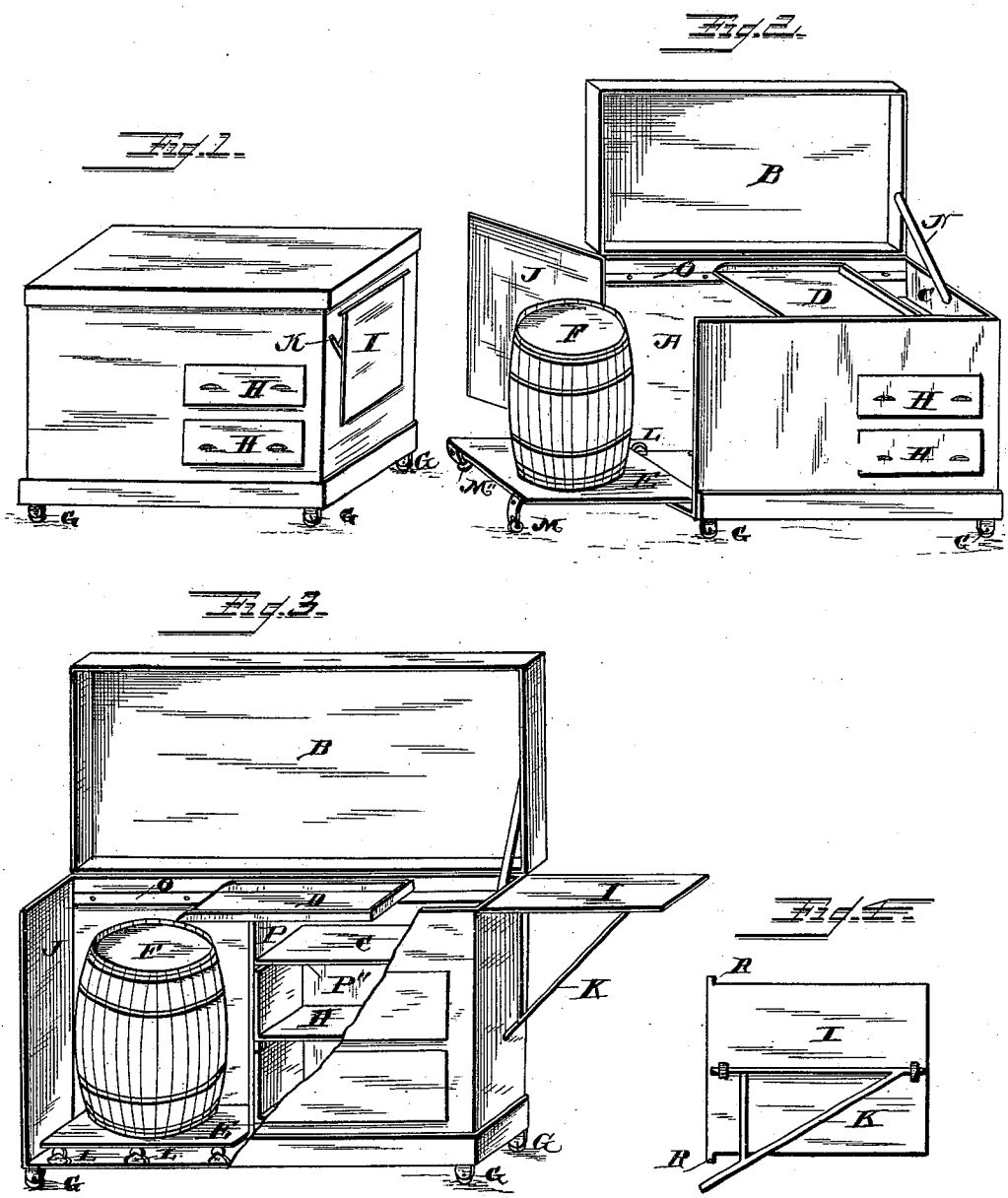

UNITED STATES PATENT OFFICE.

JOSEPH T. PAGET, OF BOSTON, MASSACHUSETTS.

KITCHEN-CABINET.

SPECIFICATION forming part of Letters Patent No. 355,553, dated January 4, 1887.

Application filed January 25, 1886. Serial No. 189,709. (No model.)

*To all whom it may concern:*

Be it known that I, JOSEPH T. PAGET, a citizen of the United States, residing at Boston, in the county of Suffolk and State of Massachusetts, have invented a new and useful Improvement in Kitchen-Cabinets, of which the following is a specification, reference being had to the accompanying drawings, forming a part thereof.

The object of my invention is to furnish to housekeepers and others a perfectly portable form of kitchen-cabinet that not only contains convenient receptacles for storing all the ingredients and utensils used in preparing bread, pastry, &c., but also the many appliances used in compounding and preparing the same for the table.

Figure 1 represents the cabinet as closed when not in use, and shows pivoted leaf I dropped down at its end. Fig. 2 represents the cabinet as about to receive a barrel of flour. The hinged or pivoted side J of compartment A and the lid or cover B are open, the pivoted leaf I raised, and the sliding bottom E extended. They are thus placed so as to show their mode of working. Fig. 3 represents the cabinet already for use after it has received the flour. It has a portion of its front removed, so as to show its interior arrangement. Fig. 4 shows the manner of attaching bracket K to leaf I.

Having thus called attention to the drawings in general, I will now proceed to describe my invention in detail.

The cabinet is of rectangular shape, about three feet long, one and one-half foot wide, and two and one-half feet high, inside dimensions, though it can be constructed of any other desirable size. The cabinet has its bottom made of sheet-iron, which extends its entire length. It is made of this material for protection against mice. It will be divided by vertical partition P and horizontal partition P'' into compartments A and C, shaped as shown in Figs. 2 and 3. Compartment A is designed for holding flour either when retained in the barrel or when poured loosely into it, as I propose to so construct the cabinet as to accommodate either mode. The rolling-pin and other utensils can be kept here, if desired.

Compartment C, Figs. 2 and 3, of which partition P'' forms the bottom, is designed to contain spices, salt, &c., together with the necessary utensils for their use.

Compartment A, Figs. 2 and 3, is so constructed that one of its ends is hinged or pivoted and can be opened, as shown at J, Fig. 2, so as to readily admit of a barrel of flour passing through. It is shown open in Fig. 2 and closed in Fig. 3.

I claim the right to hinge or pivot any side or sides of compartment A, to enable it to be opened for the purpose just mentioned.

Compartment A, Figs. 2 and 3, will be made just large enough to receive a flour-barrel, and the entrance of the latter into a space so small will naturally be attended with difficulty, and will deface and destroy the cabinet unless some way is provided to avoid it. For this purpose I have so constructed bottom E, Figs. 2 and 3, of compartment A that it can be made to slide through the space left by hinged or pivoted side J when the latter is open and project out far enough from the cabinet to receive a barrel of flour and convey it into compartment A. Bottom E, Figs. 2 and 3, thus constructed, I have mounted on casters or rolls L L L, Fig. 3, for greater ease of movement. In thus constructing bottom E, I shall adopt the mechanical devices necessary to prevent flour from sifting down around its edges onto the sheet-iron bottom of the cabinet proper should it be necessary at any time to place flour loosely in compartment A. When bottom E is extended, as above described, it will project so far out from the cabinet that unless supported the weight of a barrel of flour will so depress its outer edge as to render it almost useless for the object intended. To overcome this difficulty I have attached to its outer edge casters or rolls M M'', Fig. 2. They will be long enough to reach the floor when bottom E is extended, and will not only support the latter in that position, but will greatly assist its movement when conveying a barrel of flour into compartment A. I shall fasten them at the top with one stout pin or screw in each caster in such a manner that they can be turned up, as shown at M″, Fig. 2, when required. This will be necessary when bottom E is pushed inside compartment A.

Kneading-board D slides to and fro the entire length of the cabinet on cleats O. (Shown in Figs. 2 and 3.) It can be placed in any position where needed while in the cabinet, and can be removed therefrom for cleaning.

Cover or lid B, Figs. 2 and 3, closes tightly down over compartments A and C, as shown in Fig. 1. It is shown fully open in Figs. 2 and 3. It can be attached to the cabinet by hinges or can slide on cleats or otherwise. I reserve the right to use any or all modes.

H H, Figs. 1, 2, and 3, are drawers for containing various groceries, baking-tins, towels, and any other such articles as it may be desirable to place therein. I do not limit myself to any number of drawers, but claim the right to use one or more, as may seem best.

N, Figs. 2 and 3, is a brace that supports cover or lid B when the latter is fully open and prevents it from going back too far and stripping its hinges should the cabinet be pushed away from the wall with the cover in that position.

G G G, Figs. 1, 2, and 3, are casters or rolls, placed under each corner of the cabinet, so that it can be easily moved from one place to another.

F, Figs. 2 and 3, represents a barrel of flour. F, Fig. 2, shows it resting on sliding bottom E and about to be placed in compartment A. F, Fig. 3, shows its position after being placed in said compartment.

I, Figs. 1, 3, and 4, is a pivoted leaf attached to either end of the cabinet, and is designed, as shown in Fig. 3, to support the pans, plates, &c., that are to receive any food that may be in course of preparation in the cabinet. When not in use, it can be dropped down out of the way, as shown in Fig. 1. I have shown it as attached to the end, though I am aware that it can be attached to other parts of the cabinet, notably the front, and I reserve the right to attach it wherever may be desirable. It is supported by bracket K, as shown in Fig. 3, Bracket K is attached to leaf I by its upper part, as shown in Fig. 4.

It will be seen that the bracket K is attached to leaf I in such manner that its bottom is free and readily assumes the proper position of its own gravitation for supporting the leaf I the moment the latter is lifted. The leaf I is attached to the cabinet by means of pivots R R, Fig. 4, though hinges can be used. The advantage of attaching the bracket directly to the leaf in the manner I have described will be apparent when I state that I propose to so construct the cabinet that the leaf can be easily attached to either end or to the front, as the exigencies of the moment or the position of the cabinet may require. By attaching them together as I have they are detached from one end and attached to the other without trouble and with great saving of time. The pivots R R, Fig. 4, facilitate this transfer.

Having thus described my invention, I will now show the manner in which it should be used.

We will suppose that the cabinet is empty and in the position shown by Fig. 1. A barrel of flour has arrived, together with other articles, all of which are to be placed in their proper receptacles in the cabinet. Cover or lid B is raised, as shown in Fig. 2, the hinged or pivoted side J of compartment A is opened, sliding bottom E of same compartment is extended, and supporting casters or rolls M M″ are dropped, all as shown Fig. 2. The barrel of flour is then unheaded and placed on sliding bottom E, as shown in Fig. 2. The bottom is then pushed over rolls L L L, Figs. 2 and 3, carrying the flour with it. When its outer edge is about to enter compartment A, the supporting-casters M M″ are raised to the position shown at M‴, Fig. 2, and then all enter the compartment together, and the flour and sliding bottom E assume the positions they are shown to have taken in Fig. 3. Movable side J of said compartment A is then closed, as shown in Fig. 3, and the flour is ready for use. The spices and other articles are then placed in compartment C and drawers H H.

Should it be desirable at any time to place flour in compartment A without a barrel, hinged or pivoted side J should be closed and secured in some suitable way to prevent the loose flour from forcing it open, then pour the flour directly in upon bottom E, after covering the latter with cloth or paper to preserve cleanliness.

I will now give as an illustration the mode of preparing biscuit, which is as follows: Open lid or cover B to its full extent and place cake-board D in the center of the cabinet, both as shown in Fig. 3. Place pivoted leaf I in the position as shown by same figure. Place the flour upon the cake-board and the pans that are to receive the biscuit upon the leaf. Salt, salaratus, &c., which are kept in compartment C, can be easily reached with one hand and the flour in the barrel with the other, while the drawers H H are easily accessible should they contain any article needed. The biscuit are then prepared in the usual manner, placed in the pans awaiting them, and taken to the oven. Lid or cover B is then closed, and all is done with one-half the time, waste, and trouble that would have been incurred had the cabinet not been used.

I am aware that cabinets for kitchen use have been built before that contain to some extent a portion of the conveniences which I claim for mine, and the flour-boxes or meal-bins in such cabinets have been provided with rollers, some of which roll upon the bottom of the cabinet, while others roll upon the floor, as said boxes or bins are partially drawn from the cabinets; but I claim that none of them contain the same combination of conveniences that my cabinet possesses.

I claim as my invention—

5  A kitchen-cabinet having a flour-compartment provided with a hinged side and a false bottom, rollers between said false bottom and the bottom of said compartment, and casters hinged to said false bottom, substantially as described and set forth.

JOSEPH T. PAGET.

Witnesses:
GEORGE BECKER,
WILLIAM C. BECKER.